United States Patent

Maruyama

[11] Patent Number: 5,914,792
[45] Date of Patent: Jun. 22, 1999

[54] COLOR RECORDING METHOD AND A COLOR PRINTER

[75] Inventor: Akemi Maruyama, Tokyo, Japan

[73] Assignee: NEC Corporation, Tokyo, Japan

[21] Appl. No.: 08/767,038

[22] Filed: Dec. 12, 1996

[30] Foreign Application Priority Data

Dec. 13, 1995 [JP] Japan .................................. 7-324449

[51] Int. Cl.$^6$ .................................................. G03F 3/08
[52] U.S. Cl. .......................... 358/518; 358/501; 358/523
[58] Field of Search .................................. 358/518, 515, 358/523, 520, 519, 529, 501, 500, 521, 530, 296; 382/167, 162; 395/101, 115, 116; G03F 3/08

[56] References Cited

U.S. PATENT DOCUMENTS

| 5,453,853 | 9/1995 | Sakai et al. | 358/518 |
| 5,539,539 | 7/1996 | Fujimoto | 358/518 |
| 5,612,795 | 3/1997 | Dichter | 358/518 |
| 5,687,300 | 11/1997 | Cooper | 358/523 |
| 5,760,913 | 6/1998 | Falk | 358/298 |

FOREIGN PATENT DOCUMENTS 1-97652  4/1989  Japan .

Primary Examiner—Edward L. Coles
Assistant Examiner—Madeleine Av Nguyen
Attorney, Agent, or Firm—Foley & Lardner

[57] ABSTRACT

In a color recording method of the invention, first, a first RGB signal and a second RGB signal are, respectively, converted into a first YMC signal and a second YMC signal. Next, in case that the color components Y, M and C shown by said second YMC signal do not exceed, respectively, the color components Y, M and C shown by said first YMC signal, printing is performed by means of a third YMC signal obtained by subtracting the color components Y, M and C of said second YMC signal, respectively, from the color components Y, M and C of said first YMC signal. On the other hand, in case that any of the color components Y, M and C shown by said second YMC signal exceeds its corresponding color component of the color components of Y, M and C shown by said first YMC signal, printing is performed by means of a fourth YMC signal for performing printing with said first YMC signal after performing printing with white.

5 Claims, 4 Drawing Sheets

FIG. 4B  FIG. 4C  FIG. 4D  FIG. 4E

COLOR RECORDING METHOD AND A COLOR PRINTER

BACKGROUND OF THE INVENTION

1. Field of the Invention

The present invention relates to a color recording method and a color printer for performing color recording by means of YMC signals, and particularly to a color recording method and a color printer for performing color recording by generating YMC signals from inputted RGB signals.

2. Description of the Prior Art

A conventional color printer of a type prints out an image displayed on a color display unit. In this case, the printer converts an RGB (red, green and blue) signal for display supplied from an external apparatus such as a computer or the like into a YMC (yellow, magenta and cyan) signal for print and then records respective colors on the basis of the converted signal.

An example of the method of generating a YMC signal from an RGB signal as described above is disclosed in Japanese Patent Application Disclosure No. Hei 1-97652. A prior art method disclosed in the reference is described below with reference to FIG. 4.

FIG. 4A is a block diagram showing a main part of a printer implementing the above-mentioned method. When an RGB signal is inputted into an ink arranging section 401 shown in FIG. 4A, the ink arranging section 401 converts the RGB signal into a YMC signal and simultaneously applies a pseudo-toning process to the YMC signal with reference to a color conversion table 402 and then outputs it to a printing section 403. The printing section 403 performs printing according to the inputted YMC signal to perform color recording.

A simple example of the conversion process in the ink arranging section 401 is as follows:

$$\begin{bmatrix} Y \\ M \\ C \end{bmatrix} = \begin{bmatrix} 100 \\ 010 \\ 001 \end{bmatrix} \begin{bmatrix} \overline{R} \\ \overline{G} \\ \overline{B} \end{bmatrix} \quad (1)$$

As an example of pseudo-toning processes, a case of performing a process using a threshold value matrix X of 4×4 (Bayer type) by means of a density pattern method is described with reference to FIGS. 4B to 4E.

When a original pixel data (any one color of Y, M and C) is "7" as shown in FIG. 4B, a sample value matrix where all values in a matrix of 4×4 are "7" is generated as shown in FIG. 4C. A matrix shown in FIG. 4E is obtained by comparing the generated sample value matrix with a threshold value matrix stored in advance in the color conversion table 402 shown in FIG. 4D. Hatched parts in the matrix shown in FIG. 4E are ones where the sample value matrix is greater than the threshold value matrix and YMC signals for printing are outputted. Namely, a signal of 16 dots (4×4) can be outputted for one original picture element, where the number of dots actually outputted out of the 16 dots corresponds to the tone of the original picture element.

The printing section 403 performs printing on the basis of YMC signals obtained as a result of the above-mentioned process. This printing is performed for each of the primary colors of Y, M and C to make a three-color superposed printing.

Since in the above-mentioned method the color mixture of the respective primary colors of Y, M and C is performed by parts where the colors are actually mixed and the other parts where the colors are placed side by side and as a result two methods being different in color mixture effect co-exist, its printing result can be different from the original image. In order to avoid such a problem, the above-mentioned prior art reference has disclosed a technique of finding the optimal areas of the mixed colors obtained by the primary ink colors and their superposition and of a paper color corresponding to tristimulus values of the given RGB signals and setting these areas as output areas of the respective colors of Y, M and C. Namely, this is a method of reproducing an image by individually determining area rates in one pixel dot of the Y, M, C, R, G, B and K (black) colors made by combination of the inks of Y, M and C and a paper color W (white), and this method obtains the area rates of the Y, M, C, R, G, B and K (black) colors by solving the following expression:

$$\begin{bmatrix} R \\ G \\ B \end{bmatrix} = \begin{bmatrix} R_r & R_g & R_b & R_y & R_m & R_c & R_k & R_w \\ G_r & G_g & G_b & G_y & G_m & G_c & G_k & G_w \\ B_r & B_g & B_b & B_y & B_m & B_c & B_k & B_w \end{bmatrix} \begin{bmatrix} r \\ g \\ b \\ y \\ m \\ c \\ k \\ w \end{bmatrix} \quad (2)$$

where y, m, c, r, g, b, k and w are respectively area rates of the Y, M, C, R, G, B, K and W colors.

Since the prior art method produces the YMC signals used in printing on the assumption that printing paper is solid and white, there are the following problems:

In the case that paper on which predetermined lines, patterns or the like are recorded in advance is used as recording paper, since the grounding color is seen through, the part where the patterns or the lines have been recorded results in being seen as differently colored from the other part.

The above-mentioned phenomenon happens naturally also in case of performing printing on recording paper of an other color than white, and a reproduced image comes to be different in color from an image printed on white recording paper and as a result the color of the printed image becomes different from that intended. Particularly, it can be said that printing on paper of a deep color is hardly possible.

An object of the present invention is to provide a color recording method and a color printer capable of removing the above-mentioned disadvantages and reproducing colors with fidelity regardless of the kind of recording paper and performing natural printing also on paper other than solid paper.

SUMMARY OF THE INVENTION

According to an aspect of the invention, there is provided a color recording method which comprises the steps of:

converting a first RGB signal showing an image to be printed and a second RGB signal showing a state of recording paper which is obtained by reading the recording paper by means of a scanner, respectively, into a first YMC signal and a second YMC signal, performing printing by means of a third YMC signal obtained by subtracting the color components of said second YMC signal, respectively, from the color components of said first YMC signal in case that the color components Y, M and C shown by said second YMC signal do not exceed, respectively, the color components Y, M and C shown by said first YMC signal, and performing printing by means of a fourth YMC signal for performing printing with said first YMC signal after performing printing with white in case that any one of the color components Y, M and C shown by said second YMC signal exceeds its corresponding color component of the color components of Y, M and C shown by said first YMC signal.

According to another aspect of the invention, there is provided a color printer provided with a function of printing white which comprises:

a converting means for converting a first RGB signal and a second RGB signal, respectively, into a first YMC signal and a second YMC signal, a YMC signal generating means for generating a third YMC signal obtained by subtracting the color components Y, M and C of said second YMC signal, respectively, from the color components Y, M and C of said first YMC signal in case that the color components Y, M and C shown by said second YMC signal do not exceed, respectively, the color components Y, M and C shown by said first YMC signal, and for generating a fourth YMC signal for performing printing with said first YMC signal after performing printing with white in case that anyone of the color components Y, M and C shown by said second YMC signal exceeds its corresponding color component of the color components Y, M and C shown by said first YMC signal, and a printing means for performing printing on the basis of said third or fourth YMC signal.

In the present invention as composed above, a YMC signal for printing is generated according to the state of recording paper.

In case that recording paper is thin in pattern and color and the color components of a second YMC signal showing the state of the recording paper do not exceed, respectively, the color components Y, M and C of a first YMC signal showing an image to be printed, printing is performed by means of a YMC signal obtained by subtracting the second Y, M and C components, respectively, from the first Y, M and C components.

In case that recording paper is thick in pattern and color and anyone of the color components of a second YMC signal exceeds its corresponding color component of the color components of a first YMC signal showing an image to be printed, printing is first performed with white and then performed by means of the first YMC signal.

BRIEF DESCRIPTION OF THE DRAWINGS

Other features and advantages will become apparent from the following detailed description when taken in conjunction with the accompanying drawings, in which:

FIGS. 4B to 4E are schematic diagrams for explaining a process of generating a YMC signal in the prior art printer.

DETAILED DESCRIPTION OF THE PREFERRED EMBODIMENT OF THE INVENTION

An embodiment of the invention will be next described in detail with reference to the drawings.

Figure 1:
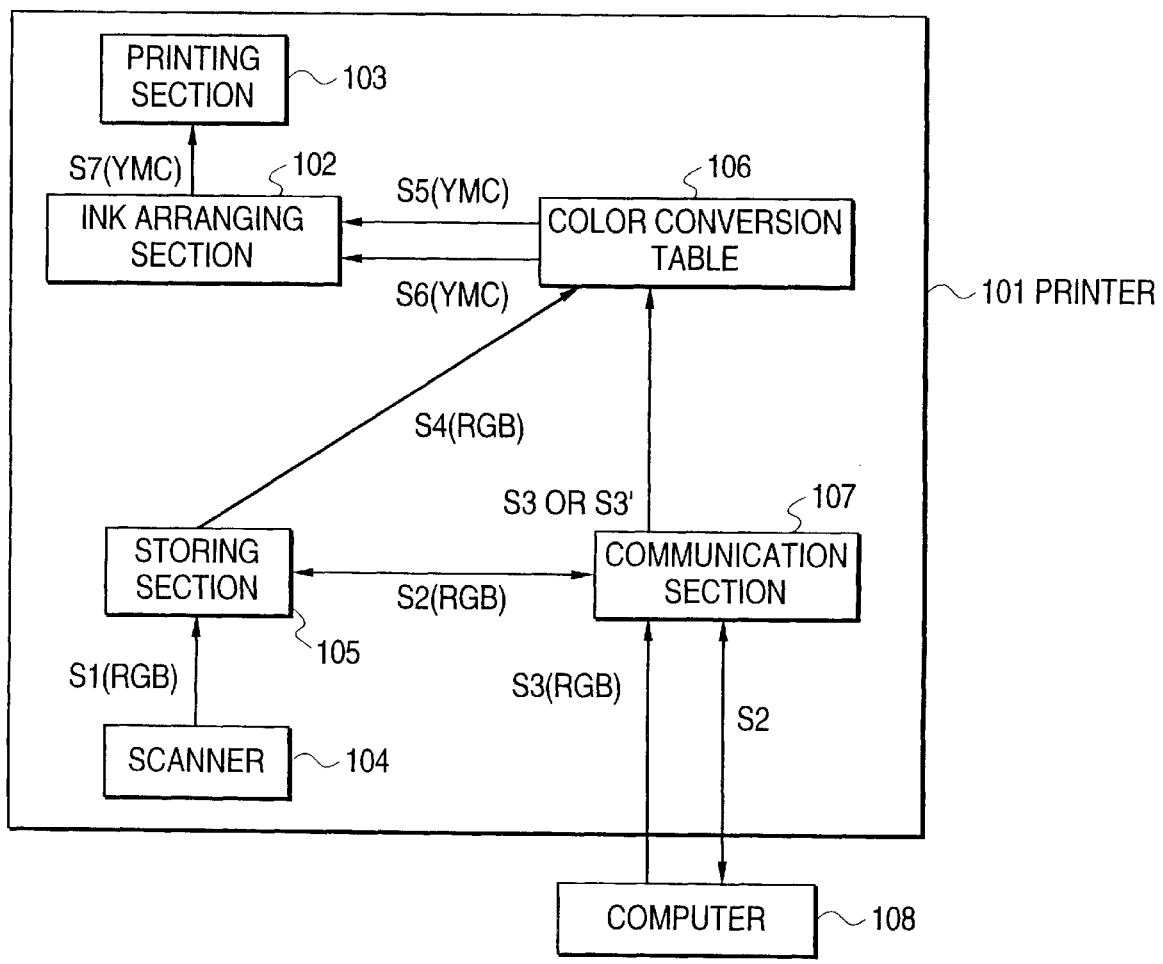
FIG. 1 is a block diagram of an embodiment of a printer of the present invention.

Referring to FIG. 1, an embodiment of a printer 101 of the invention comprises an ink arranging section 102, a printing section 103, a scanner 104, a storing section 105, a color conversion table 106 composing a YMC signal generating means in conjunction with the ink arranging section 102, and a communication section 107, and performs printing according to an RGB signal S3 inputted from a computer 108 which is an external apparatus and an RGB signal S1 outputted from the scanner 104.

The RGB signals S1 and S3 are given to the color conversion table 106 and the color conversion table 106 generates YMC signals S5 and S6, respectively, on the basis of the given RGB signals S1 and S3 and outputs the YMC signals S5 and S6 to the ink arranging section 102. The ink arranging section 102 generates a YMC signal S7 on the basis of the YMC signals S5 and S6 and outputs the YMC signal S7 to the printing section 103. The printing section 103 is provided with a printing means for printing black and white in addition to a printing means for printing the color components of Y, M and C which is usually provided, and the YMC signal S7 used in this embodiment contains information to instruct white printing.

The RGB signal S1 supplied from the scanner 104 shows a result of reading recording paper and the result of reading contains the color of the whole recording paper including a pattern recorded in advance on the recording paper, and the RGB signal S1 is supplied to the storing section 105. The storing section 105 stores temporarily the given RGB signal S1 therein and outputs it as RGB signals S2 and S4 to the communication section 107 and the color conversion table 106.

The storing section 105 stores therein an RGB signal, S1 supplied from the scanner 104, as an RGB signal S2 relating to a pattern and as an RGB signal S4 showing color information of recording paper, in accordance with a user's instruction inputted together with the RGB signal S1. And the storing section 105 is connected to the computer 108 through the communication section 107.

The computer 108 outputs an image signal for printing to the color conversion table 106 through the storing section 105 as an RGB signal S3, and at this time the computer 108 can make the communication section 107 read an RGB signal S2 stored in the storing section 105 and can make the communication section 107 generate an RGB signal S3' obtained by combining the RGB signal S2 with the RGB signal S3. The computer 108 is constructed so that it can make the storing section 105 output an RGB signal S4 showing color information of recording paper to the color conversion table 106.

As described above, by making it possible for the storing section to communicate with an external apparatus, for example, it is possible to scan recording paper on which a predetermined input format is recorded, store the resultant signals, read out them and add additional data to them. In this case, the data can be securely matched with the input format.

The color conversion table 106 receives an RGB signal S3 (or RGB signal S3') and an RGB signal S4, and converts them into a YMC signal S5 and a YMC signal S6 and then outputs the YMC signals S5 and S6 to the ink arranging section 102. The ink arranging section 102 which has received the YMC signals S5 and S6 generates a YMC signal S7 according to them and then outputs it to the printing section 103.

Figure 4A:
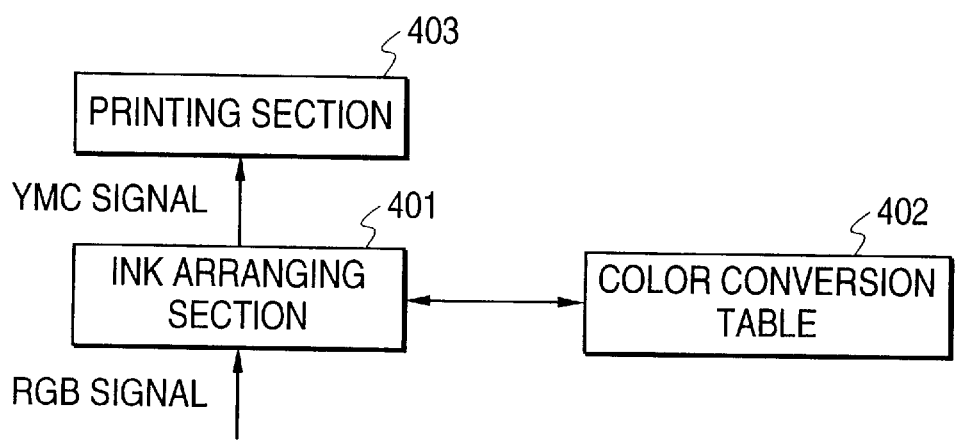
FIG. 4A is a block diagram of a prior art printer.
Figure 4A:
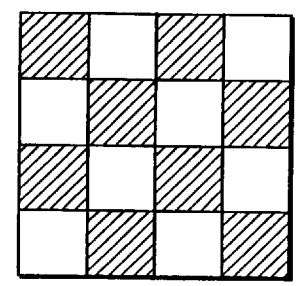

Although the conversion of an RGB signal to a YMC signal performed by the color conversion table 106 is performed by the same conversion process as the prior art method shown in FIG. 4, namely, a pseudo-toning process, an area rate determining process by means of the expression (2) or the like, a method for generating a YMC signal is not limited to these methods.

A method for generating a YMC signal S7 by means of the ink arranging section 102 in this embodiment is described with reference to FIGS. 2 and 3.

The ink arranging section 102 is constructed so that a YMC signal S5 converted from an RGB signal S3 (or RGB signal S3') showing an image from the computer 108 and a YMC signal S6 converted from an RGB signal S4 from the storing section 105 can be inputted to the ink arranging section 102, as described above.

The ink arranging section 102 constantly check the input of a YMC signal S5 (step S301 in FIG. 3), and when it has confirmed the input of a YMC signal S5, it further checks input of a YMC signal S6 (step S302). In case that a YMC signal S5 only is inputted and the input of a YMC signal S6 is not confirmed, the YMC signal S5 is outputted to the printing section 103 as a YMC signal S7 (step S303), and the operation is terminated. In case that both of the YMC signals S5 and S6 are confirmed to have been inputted, the YMC signals are compared with each other. In this comparison, it is checked whether or not any one of the Y, M and C components of the YMC signal S6 exceeds its corresponding color component of the Y, M and C components of the YMC signal S5 (step S304).

In case that it has been confirmed that any of the Y, M and C components of the YMC signal S6 does not exceed its corresponding color component of the Y, M and C components of the YMC signal S5 in the confirmation in step S304, a signal obtained by subtracting the color components Y, M and C of the YMC signal S6, respectively, from the color components Y, M and C of the YMC signal S5 is outputted to the printing section 103 as a YMC signal S7 (step S305). In case that it has been confirmed that any one of the Y, M and C components of the YMC signal S6 exceeds its corresponding color component of the Y, M and C components of the YMC signal S5, a YMC signal S7 for perform-ing printing with the YMC signal S5 after printing white is generated and outputted to the printing section 103 (step S306).

The confirming operation in step S304 and the operation of generating a YMC signal S7 in steps S305 and S306 are described with reference to FIG. 2.

Figure 2A:
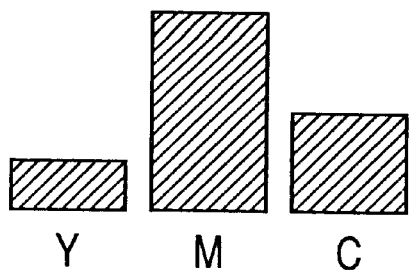
FIGS. 2A to 2D are schematic diagrams for explaining a process of generating a YMC signal for printing in the embodiment of the invention.
Figure 2B:
Figure 2B:
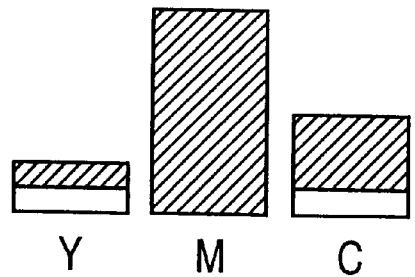
Figure 2C:
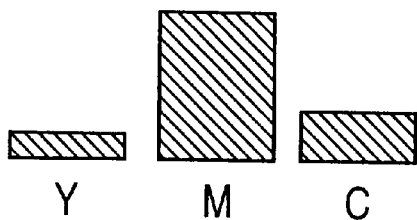
Figure 2C:
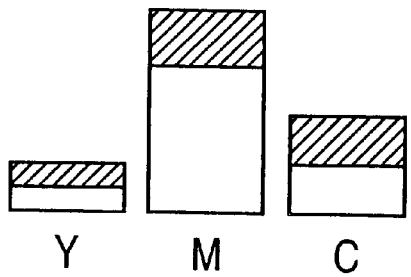
Figure 2D:
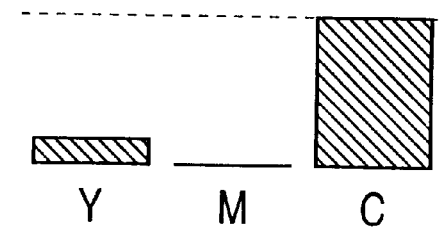
Figure 2D:
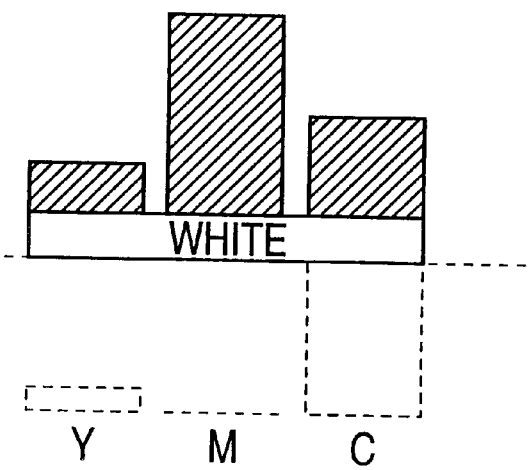
Figure 3:
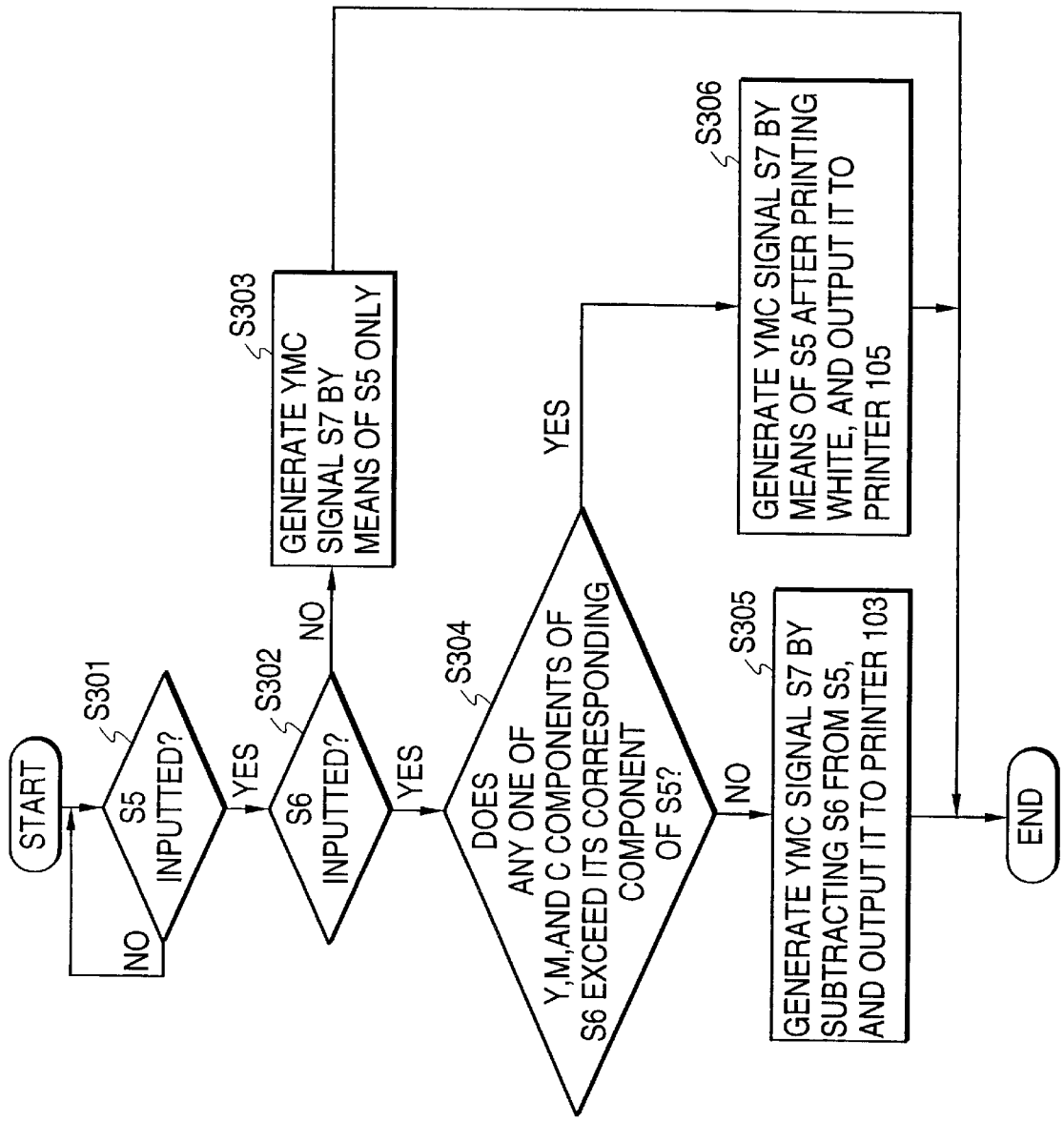
FIG. 3 is a flowchart showing an operation of generating a YMC signal for printing in the embodiment.

It is assumed that FIG. 2A shows the color components Y, M and C shown by a YMC signal S5 and FIGS. 2B to 2D show the color components Y, M and C shown by a YMC signal S6. Since any of the color components Y, M and C shown in FIGS. 2B and 2C does not exceed its corresponding color component of the color components Y, M and C shown in FIGS. 2A, a signal obtained by subtracting the color components Y, M and C shown by the YMC signal S6 from the color components Y, M and C shown by the YMC signal S5 shown in FIG. 2A becomes a YMC signal S7, and the hatched parts in FIGS. 2B' and 2C' are outputted.

The C (cyan) component out of the color components Y, M and C shown in FIG. 2D exceeds the C component shown in FIG. 2A. Therefore, a signal for performing printing by means of a YMC signal S5 after printing white is outputted as a YMC signal S7, as shown in FIG. 2D'.

The above-mentioned embodiment has been described on the assumption that a scanner is built in the printer, but the scanner may be naturally provided as an external apparatus to the printer like the computer 108.

A first effect of the invention is to make it possible to stabilize printing quality regardless of the color or the pattern of recording paper.

A second effect of the invention is to make it possible to reduce consumption of recording materials used in printing such as ink and so on since a YMC signal is generated in consideration of the color of recording paper itself in case of performing printing on recording paper of light color.

A third effect of the invention is to make it possible to effectively utilize data stored in a storage device and easily perform printing on paper having a pre-printed format or pattern on it.

What is claimed is:

1. A color recording method comprising the steps of:
   converting a first RGB signal showing an image to be printed and a second RGB signal showing a state of recording paper which is obtained by reading said recording paper by means of a scanner, respectively, into a first YMC signal and a second YMC signal;
   performing printing by means of a third YMC signal obtained by subtracting the color components of said second YMC signal, respectively, from the color components of said first YMC signal in case that the color components Y, M and C shown by said second YMC signal do not exceed, respectively, the color components Y, M and C shown by said first YMC signal; and
   performing printing by means of a fourth YMC signal for performing printing with said first YMC signal after performing printing with white in case that anyone of the color components Y, M and C shown by said second YMC signal exceeds its corresponding color component of the color components Y, M and C shown by said first YMC signal.

2. A color printer provided with a function of printing white, comprising:

a converting means for converting a first RGB signal and a second RGB signal, respectively, into a first YMC signal and a second YMC signal;

a YMC signal generating means for generating a third YMC signal obtained by subtracting the color components Y, M and C of said second YMC signal, respectively, from the color components Y, M and C of said first YMC signal in case that the color components Y, M and C shown by said second YMC signal do not exceed, respectively, the color components Y, M and C shown by said first YMC signal, and for generating a fourth YMC signal for performing printing with said first YMC signal after performing printing with white in case that any one of the color components Y, M and C shown by said second YMC signal exceeds its corresponding color component of the color components of Y, M and C shown by said first YMC signal; and a printing means for performing printing on the basis of said third or fourth YMC signal.

3. A color printer as claimed in claim 2, further comprising:

a storing means for storing said first RGB signal and said second RGB signal; and a communication means for making it possible to input and output data stored in said storing means from and to an external apparatus.

4. A color printer as claimed in claim 2, further comprising:

a scanner whose output signal is used as said second RGB signal.

5. A color printer as claimed in claim 3, further comprising:

a scanner whose output signal is used as said second RGB signal.

* * * * *